Jan. 18, 1938.  E. E. HALL  2,106,002

PORTABLE WINDOW SCAFFOLD

Filed Jan. 6, 1937

Inventor:
Eric E. Hall,
By Banning & Banning,
Attorneys.

Patented Jan. 18, 1938

2,106,002

UNITED STATES PATENT OFFICE 2,106,002

PORTABLE WINDOW SCAFFOLD

Eric E. Hall, Chicago, Ill.

Application January 6, 1937, Serial No. 119,296

7 Claims. (Cl. 304—24)

The present invention is directed to a portable window scaffold or platform adapted to be moved from place to place within the interior of a building and projected outwardly through a window to afford a safe and convenient scaffold outside of the window for the purpose of facilitating cleaning thereof or for similar purposes.

The scaffold is so constructed that it may be folded into a comparatively small compass for storage and afterwards extended to the desired degree to meet any local requirements having to do with the height of the window sill above the floor, the degree of projection required to gain convenient access to the exterior of the window, the weight of the window cleaner, and the available space within the interior in proximity to the window. The device is made adjustable in various ways to meet all of these requirements, and at the same time to afford a safe, convenient, compact and easily removable device for the purpose stated.

Further objects and details will appear from a description of the invention in conjunction with the accompanying drawing, wherein,—

Figure 1:
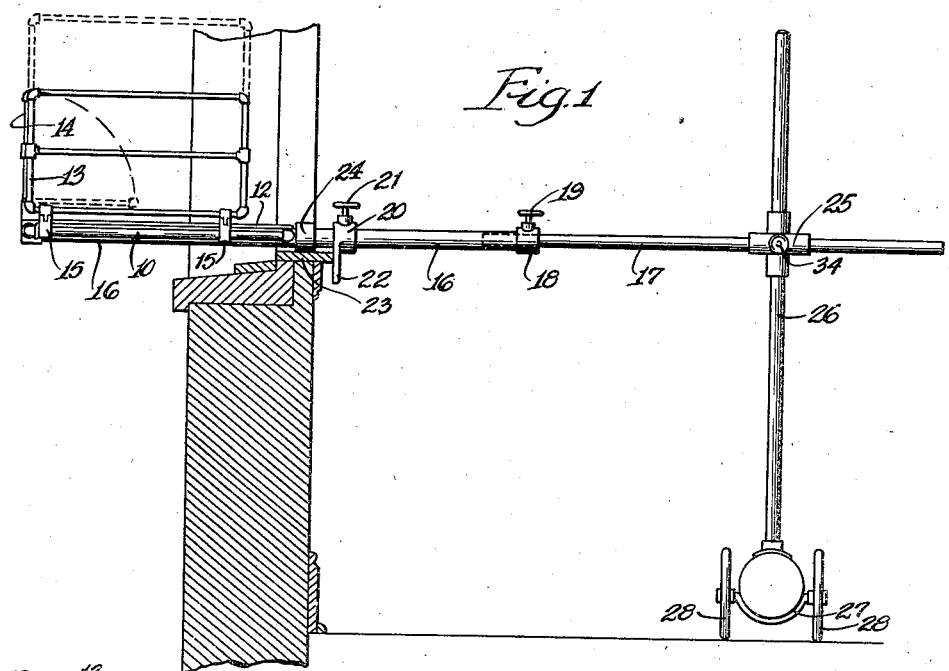
Figure 1 is a side elevation of the device with the platform projecting beyond a window.
Figure 2:
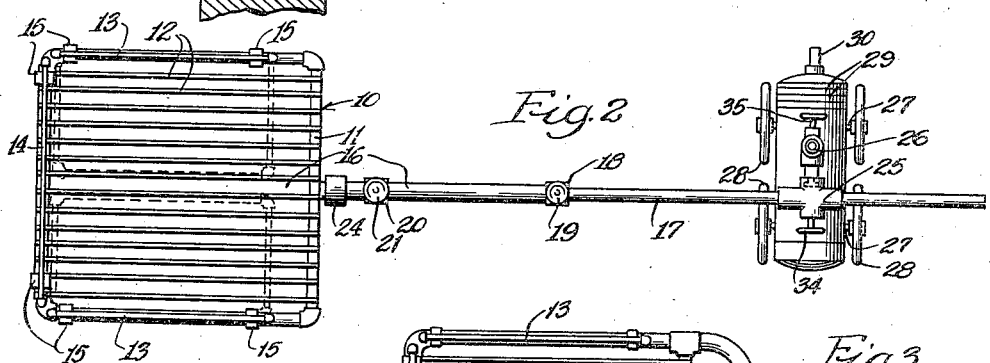
Fig. 2 is a plan view of the same.

The device comprises a platform 10, which in the form shown is constructed with an outer rectangular frame 11 and cross bars or slats 12, although obviously any suitable form of platform may be employed. As shown, the platform is provided with hinged side rails 13 and an outer rail 14, which rails are suitably hinged to clips or brackets 15 so disposed as to permit the side rails to be folded inwardly, as shown by the dotted lines in Fig. 2, and the outer rail to be swung downwardly thereon, as occasion may require.

The platform is rigidly mounted upon the outer section 16 of an extension rod, which outer section is telescoped upon an inner section 17, a suitable collar 18 and locking wheel 19 being provided to permit the operator to adjust the length of the rod to local conditions. Upon the rod is mounted a slidable collar 20 carrying a locking wheel 21, which collar mounts a depending stop 22 adapted to be brought into contact with the inner edge of a window sill 23. If desired, the stop 22 may be provided with a suitable cushion face to prevent marring of the woodwork, and for a like purpose the extension rod is provided with a cushion collar 24 of rubber or the like, which rests upon the surface of the window sill.

Figure 4:
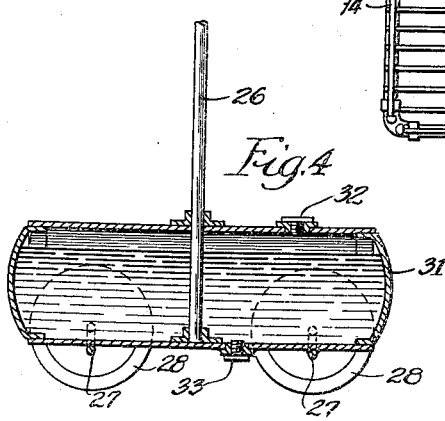
Fig. 4 is a special form of weight afforded by a hollow tank adapted to be filled with water.

The inner end of the extension rod is entered through a T-shaped fitting 25 slidably mounted upon a vertical post 26 carried by a weighted truck 27 having truck wheels 28, which are preferably provided with rubber tires to run easily upon the surface of the floor. In order to afford the necessary weight to counter-balance the weight of the window cleaner standing beyond the point of support upon the window sill, the truck is made sufficiently heavy to afford abundant safety against the lifting of the extension rod under the window cleaner's weight. If desired, the truck may be provided with removable weights 29 threaded upon a stem 30, as in Fig. 2, or in lieu thereof the truck body may be wholly in the form of a tank 31, as in Fig. 4, having a plug 32, which permits the tank to be filled with water to afford the necessary weight, and a drain plug 33 for the draining of the water.

The T-shaped fitting 25 is provided with a locking wheel 34 for locking the fitting to the inner section of the extension bar in suitably adjusted relation thereto, and the section of the fitting which embraces the vertical post 26 is likewise provided with a locking wheel 35, which permits vertical adjustment of the extension bar with respect to the post 26, so that the parts may be adjusted to the proper elevation to clear the window sill irrespective of its height.

Figure 3:
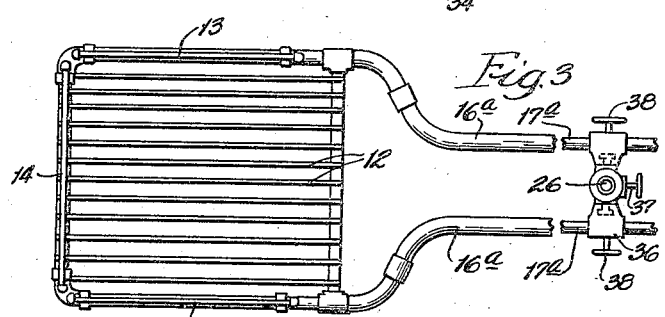
Fig. 3 is a slight modification in the construction thereof.

Fig. 3 shows a slight modification in which duplicate extension bars, consisting of outer sections 16a and inner sections 17a telescoping thereinto, are employed. The inner sections are entered through the arms of a fitting 36, which embraces the post 26 and is adjustable thereon and locked thereto by a locking wheel 37. The fitting 36 is adapted to be locked to the extension rod sections 17a by means of locking wheels 38. Aside from the duplication of parts, the construction shown in Fig. 3 is substantially similar to that first described.

The arrangement is one which permits the extension bar (or bars) to swivel upon the fitting which connects them with the vertical post, so that, by closing up the extensible sections and bringing the extension bar into parallel relation with the post and by folding the side rails of the platform, the entire structure can be brought into a compact compass for the purpose of housing in a closet or limited storage space.

When it is desired to use the device, the extension rod (or rods) will be elevated to the proper level to clear the intended window sill and extended to an adequate degree to afford the necessary leverage effect to counteract the weight of the window cleaner, so that where adequate interior space is available it will not be necessary to provide an extremely heavy weighted truck, although, as before stated, the necessary weight can be afforded to provide a safe support for the window cleaner even in cases where it is impossible to locate the truck at a considerable distance inwardly from the window.

The arrangement is one which provides a safe, convenient, and easily manipulated apparatus for the cleaning of windows, and enables the window cleaner to move the device from window to window within the interior of the building, and to very quickly project the platform through the window to the proper position, and after cleaning the window to move the apparatus and repeat the operation as many times as occasion may require.

I claim:

1. In a portable window scaffold, the combination of a platform adapted to be projected beyond a window sill, an adjustable extension rod supporting the platform at its outer end and adapted to rest upon a window sill, and a portable weighted member connected to the inner portion of the adjustable extension rod and adapted to rest upon the floor and to counter-balance the weight of the occupant of the platform, the weighted member being adjustable longitudinally of the extension rod to vary the leverage effect of the weight afforded thereby and adjustable vertically thereof to accommodate window sills located at different levels above the floor.

2. In a portable window scaffold, the combination of a platform, an extension rod supporting the platform at its outer end and adapted to rest upon a window sill and to have its inner end projecting inwardly therefrom, a vertical post longitudinally adjustable upon the inner end of the extension rod, and a weighted portable wheeled truck member supporting the vertical post and adapted for movement upon the floor of a building.

3. In a portable window scaffold, the combination of a platform, an extension rod supporting the platform at its outer end and adapted to rest upon a window sill and to have its inner end projecting inwardly therefrom, a vertical post longitudinally adjustable upon the extension rod, and a weighted portable wheeled truck member supporting the vertical post and adapted for movement upon the floor of a building, the extension rod being vertically adjustable upon the post to accommodate window sills located at different levels above the floor.

4. In a portable window scaffold, the combination of a platform having a foldable rail secured to one of its edges, an extension rod having the platform secured to its outer end and adapted to rest upon a window sill, a vertical post adjustably secured to the extension rod, and a truck member carrying the post and adapted for movement across the floor of a building and adapted to afford the required weight for counter-balancing the weight of the occupant of the platform.

5. In a portable window scaffold, the combination of a platform having a foldable rail secured to one of its edges, an extension rod having the platform secured to its outer end and adapted to rest upon a window sill, the extension rod being adjustable as to length, a vertical post adjustably secured to the extension rod, and a truck member carrying the post and adapted for movement across the floor of a building and adapted to afford the required weight for counter-balancing the weight of the occupant of the platform.

6. In a portable window scaffold, the combination of a platform having a foldable rail secured to one of its edges, an extension rod having the platform secured to its outer end and adapted to rest upon a window sill, a vertical post adjustably secured to the extension rod, a truck member carrying the post and adapted for movement across the floor of a building and adapted to afford the required weight for counter-balancing the weight of the occupant of the platform, and means for varying the weight of the portable truck member.

7. In a portable window scaffold, the combination of a platform having a foldable rail secured to one of its edges, an extension rod having the platform secured to its outer end and adapted to rest upon a window sill, the extension rod being adjustable as to length, a vertical post adjustably secured to the extension rod, and a truck member carrying the post and adapted for movement across the floor of a building and adapted to afford the required weight for counter-balancing the weight of the occupant of the platform, and means for varying the weight of the portable truck member.

ERIC E. HALL.